United States Patent
Contreras et al.

(10) Patent No.: US 7,619,843 B2
(45) Date of Patent: Nov. 17, 2009

(54) WRITE THROUGH DRIVERS FOR DISK DRIVE SYSTEMS

(75) Inventors: John Thomas Contreras, Palo Alto, CA (US); Klaas Berend Klaassen, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 92 days.

(21) Appl. No.: 11/559,824

(22) Filed: Nov. 14, 2006

(65) Prior Publication Data

US 2008/0112085 A1 May 15, 2008

(51) Int. Cl.
G11B 5/09 (2006.01)
(52) U.S. Cl. ........................................................ 360/46
(58) Field of Classification Search .................. 360/46, 360/67, 68, 65, 234.4; 326/82; 375/376; 365/189.02; 710/3, 9, 105, 305
See application file for complete search history.

(56) References Cited

U.S. PATENT DOCUMENTS

| | | | | |
|---|---|---|---|---|
| 5,574,866 A | * | 11/1996 | Smith et al. | 710/105 |
| 5,748,922 A | * | 5/1998 | Smith et al. | 710/305 |
| 5,748,982 A | * | 5/1998 | Smith et al. | 710/9 |
| 5,784,642 A | * | 7/1998 | Smith et al. | 710/3 |
| 5,999,991 A | * | 12/1999 | Smith et al. | 710/9 |
| 6,014,281 A | | 1/2000 | Contreras | |
| 6,023,735 A | * | 2/2000 | Smith et al. | 710/3 |
| 6,201,653 B1 | | 3/2001 | Contreras et al. | |
| 6,215,497 B1 | * | 4/2001 | Leung | 345/419 |
| 6,356,113 B1 | | 3/2002 | Contreras et al. | |
| 6,671,113 B2 | | 12/2003 | Klaassen et al. | |
| 6,762,893 B2 | * | 7/2004 | Wilson et al. | 360/31 |
| 7,110,321 B1 | * | 9/2006 | Gibson | 365/189.02 |
| 7,224,760 B1 | * | 5/2007 | Rokhsaz et al. | 375/376 |
| 7,298,570 B1 | * | 11/2007 | Han | 360/65 |
| 2002/0008559 A1 | | 1/2002 | Krishnamurthy et al. | |
| 2005/0231843 A1 | | 10/2005 | Venca et al. | |

FOREIGN PATENT DOCUMENTS

WO 03/063139 7/2003

OTHER PUBLICATIONS

European Patent Office, "European Search Report," Application No. 07013735.1, May 15, 2009, pp. 1-7.

* cited by examiner

*Primary Examiner*—Fred Tzeng
(74) *Attorney, Agent, or Firm*—Steven J. Cahill

(57) ABSTRACT

Circuits and methods are provided for write through drivers in disk drive systems. A write through driver is a transceiver that includes a write driver circuit and a receiver circuit. The write driver drives a current signal to a write element through a first conductive interconnect. The write element writes data patterns to a magnetic hard disk in response to the current signal from the write driver circuit. The current signal returns to the receiver circuit through a second conductive interconnect. The return signal can be used for the diagnosis of write-safe conditions.

19 Claims, 4 Drawing Sheets

WRITE THROUGH DRIVERS FOR DISK DRIVE SYSTEMS

BACKGROUND OF THE INVENTION

The present invention relates to techniques for writing data in disk drive systems, and more particularly, to write drivers that provide write current to write elements in disk drive systems.

Magnetic data storage devices, and in particular hard disk drive storage devices, have become an essential component in modern computer systems. An example of a well-known hard disk drive storage device 100 is shown in FIG. 1. Hard disk drive 100 includes an enclosure 101 that contains one or more magnetic media platters or disks 102, read elements 104, write elements 105, an actuator arm suspension 106, a transmission line interconnect 108, a read/write integrated circuit (IC) 110, a flexible interconnect cable 112, and a disk enclosure connector 114.

Magnetic media disks 102 store information on their surfaces. Read elements 104 and write elements 105 are mounted on actuator arm suspension 106 and are located in proximity to the surfaces of disks 102. Actuator arm suspension 106 moves the read/write elements into proximity to a selected portion of disks 102 that contains the information to be read, or that has open area where new information is to be recorded. Write elements 105 write information in response to input electrical signals, and read elements 104 read recorded information and output electrical signals representing the information.

The electrical signals are communicated between the read/write elements and read/write integrated circuit 110 over transmission line interconnect 108. Read/write integrated circuit 110 conditions the electrical signals so that they can drive write element 105 during writing and amplifies the electrical signal from read element 104 during reading. Signals are communicated between read/write integrated circuit 110 and disk enclosure connector 114 over flexible cable 112. Disk enclosure connector 114 conducts signals with circuitry external to disk enclosure 101.

A profile view of the structure of hard disk drive 100 is shown in FIG. 2 with two disks 102A and 102B. Disk drive 100 has four read elements 104A-D and four write elements 105A-D. After read/write integrated circuit 110 selects one of the read or write elements, data is read from, or written to, the selected element.

Read/write IC 110 typically includes a write driver that drives current to one of the write elements. Typical write driver circuit designs consume a considerable amount of power. These high-power designs cause an undesirably large amount of heat dissipation through the actuator.

In a typical hard disk drive storage system, the read/write integrated circuit 110 is located relatively far away (approximately 5 cm) from the read and write elements. Because of the length of the transmission line interconnect between circuit 110 and the read/write elements, it is difficult to obtain the desired performance when writing information to the disk. The time it takes for the write current from the write driver to reverse is typically in the sub-nanosecond range at higher data rates, which creates design challenges for the output impedance of a typical write driver circuit design.

Typically, the write driver's output impedance-value configuration is set to be equivalent or greater than the characteristic impedance of the transmission line interconnect. With this value configuration, the write signals are well behaved or can have some overshoot, for when the output impedance is greater than the transmission line interconnect impedance. If the write element's impedance is mismatched with the characteristic impedance of the transmission line interconnect, signal reflections from the write element can occur. The reflected signal is then terminated at the output port of the write driver's output. The reflected signal can interfere with the transmitted signal, causing distortion and degrading signal integrity.

Therefore, it would be desirable to provide a write driver circuit that consumes less power, obtains a higher performance, and minimizes signal reflection on the transmission line interconnect.

BRIEF SUMMARY OF THE INVENTION

The present invention provides circuits and methods for write through drivers in disk drive systems. A write through driver is a transceiver that includes a write driver circuit and a receiver circuit. The write driver circuit drives a current signal to a write element through a first conductive interconnect. The write element writes data patterns to a magnetic hard disk in response to the current signal from the write driver circuit. The current signal returns to the receiver circuit in the write though driver through a second conductive interconnect. The return signal can be used for the diagnosis of write-safe conditions.

Other objects, features, and advantages of the present invention will become apparent upon consideration of the following detailed description and the accompanying drawings.

DETAILED DESCRIPTION OF THE INVENTION

Figure 1:
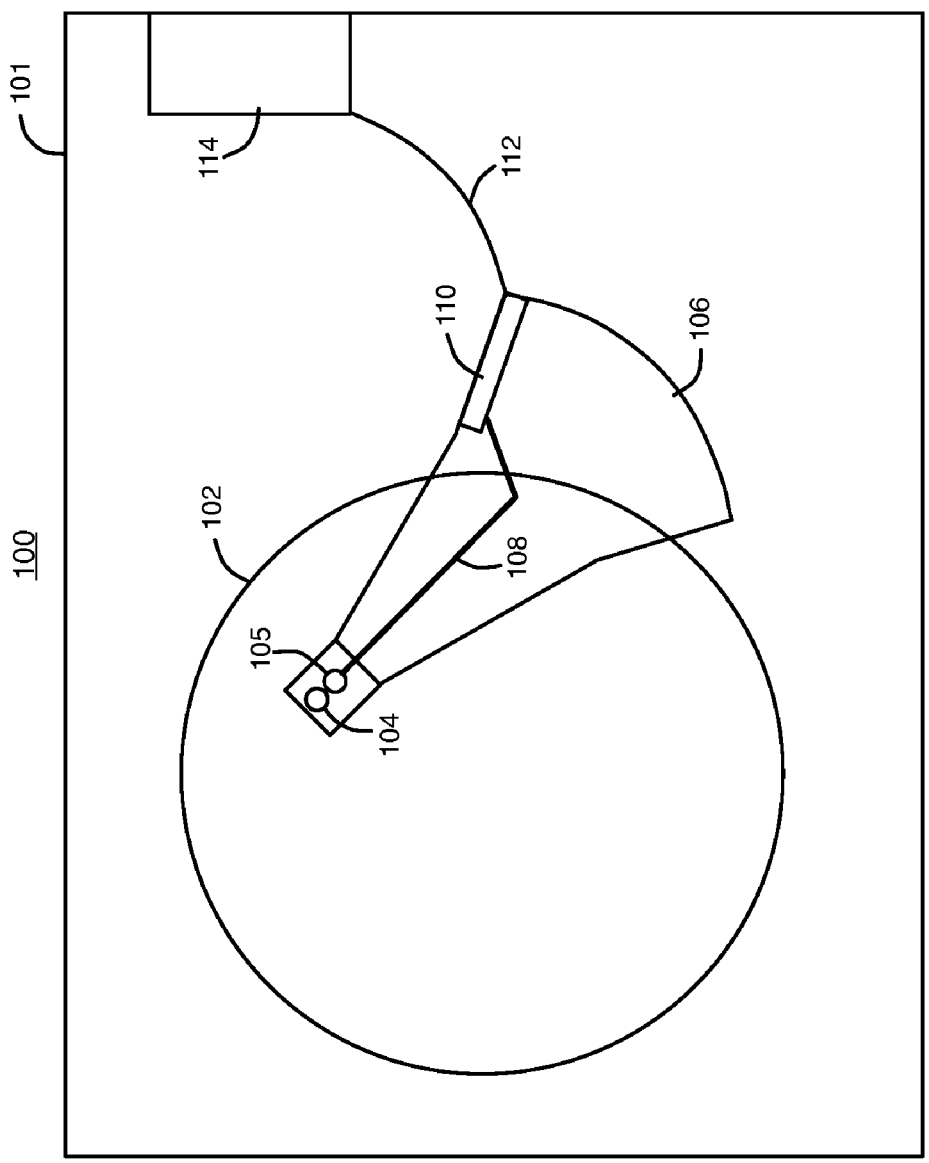
FIG. 1 is a block diagram of a prior art hard disk drive storage system.
Figure 2:
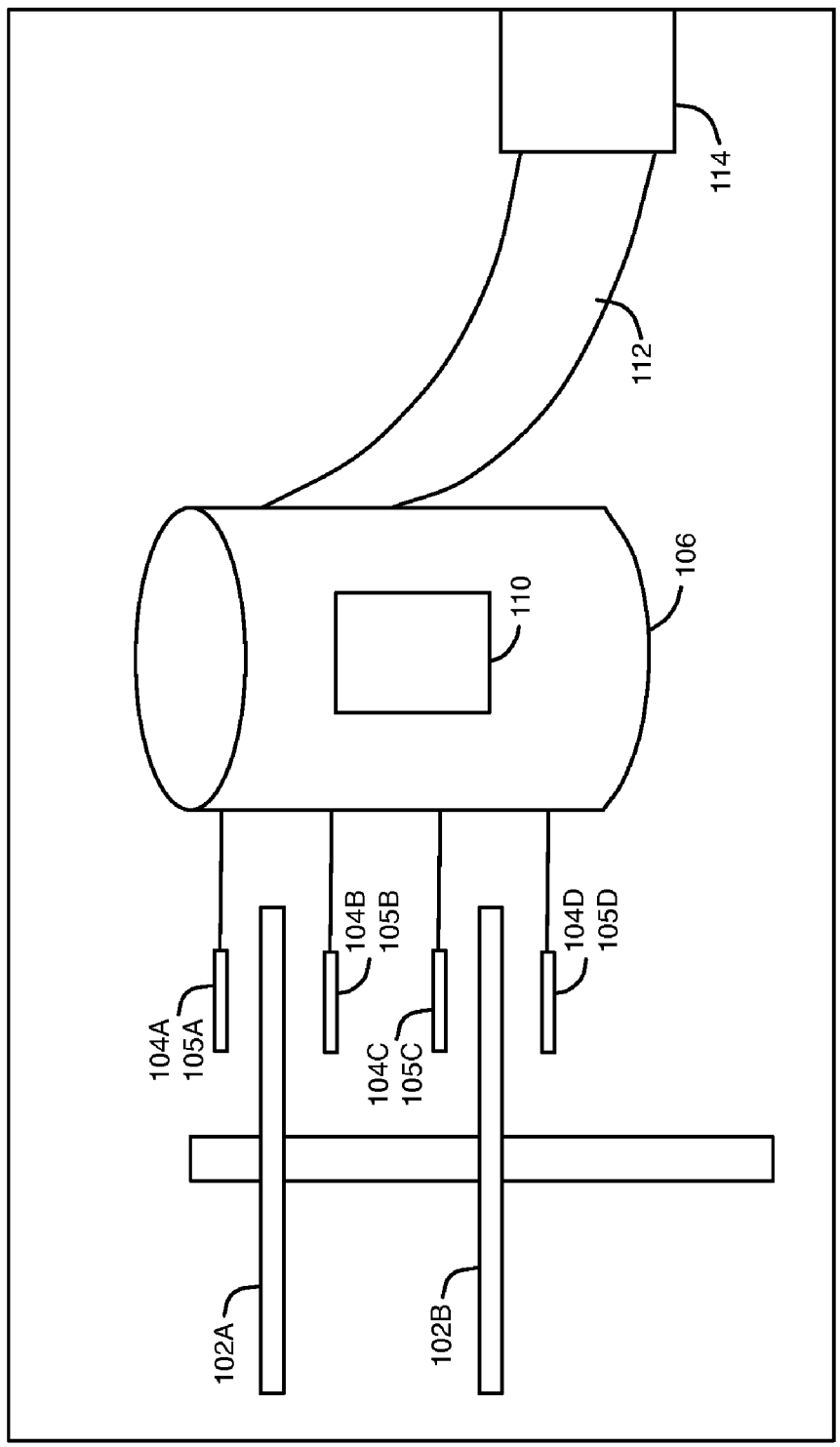
FIG. 2 is another block diagram of a prior art hard disk drive storage system.
Figure 3:
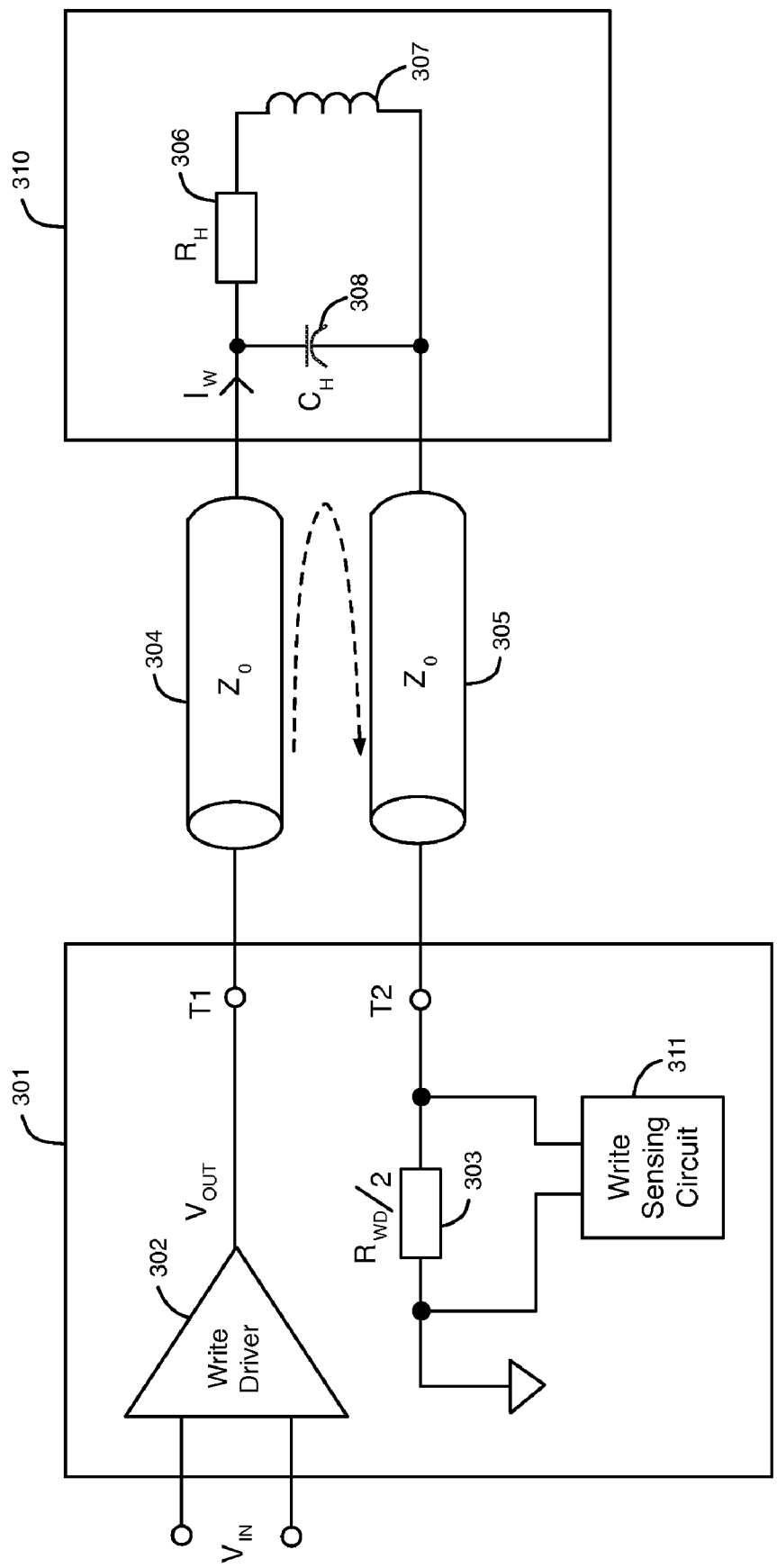
FIG. 3 illustrates a write through driver, according to an embodiment of the present invention.

FIG. 3 is a diagram of a write through driver circuit, according to an embodiment of the present invention. FIG. 3 illustrates a read/write integrated circuit (IC) 301, conductive transmission line interconnects 304 and 305, and a write element 310. Read/write IC 301 is coupled to write element 310 through conductive transmission line interconnects 304 and 305.

Read/write IC 301 includes a write driver 302, a resistor 303, a write sensing circuit 311, and terminals T1 and T2. Terminals T1 and T2 are coupled to transmission line interconnects 304 and 305, respectively. Resistor 303 is coupled between terminal T2 and ground. Resistor 303 can be any type of resistive circuit such as a passive resistor or an active element (e.g., a transistor).

Read/write IC 301 is formed on a single die. Write element 310 is typically part a die that is separate from the die containing read/write IC 301. Write element 310 includes resistor 306, capacitor 308, and inductor 307. Write element 310 is merely one example of a write element that can be used with a write through driver of the present invention. Many other types of write elements can also be used with a write through driver of the present invention.

In write element 310, resistor 306 is coupled is series with inductor 307. Capacitor 308 is coupled in parallel with resistor 306 and inductor 307. Inductor 307 and capacitor 308 are coupled to resistor 303 in read/write IC 301 through transmission line interconnect 305.

The input terminals of write driver 302 are coupled to receive a differential input voltage $V_{IN}$. The single-ended output of write driver 302 is coupled to write element 310 through transmission line interconnect (TLI) 304. Write driver 302 transmits a single-ended write current signal $I_W$ from its single-ended output to write element 310 in response to the input voltage signal $V_{IN}$. The input voltage signal $V_{IN}$ is a high speed read/write data signal that is transmitted along flexible interconnect cable 112 from a channel IC. The write current signal $I_W$ drives write element 310 to write magnetic data patterns on a magnetic hard disk.

The read/write IC 301 has a transceiver that includes write driver 302 and resistor 303. The transceiver transmits an output current signal $I_W$ at output terminal T1 and receives a return signal at input terminal T2. The transceiver is a write through driver in the sense that the write current $I_W$ is transmitted from a write driver 302 through write element 310 to resistor 303. Write driver 302 acts as a transmitter circuit in the transceiver, because it transmits a write current signal $I_W$ to the write element 310. Resistor 303 acts as a receiver circuit in the transceiver, because it receives the write current signal from the write element 310.

The write through driver of FIG. 3 essentially treats the write element inductor 307 as a short by transmitting a single-ended current signal through the write element 310 from the write driver 302 to the resistor 303. The write element 310 is treated as a connection between two transmission lines 304 and 305 along a path from the write driver 302 to ground.

The impedance of today's write elements is relatively low compared to the write driver's output impedance and the characteristic impedance of the transmission line interconnect. In the past, the inductances of write elements have been in the range of 20-50 nanohenrys (nH). The inductances of present write elements have been reduced significantly. For example, a write element in a hard disk drive manufactured at the present time can be, e.g., about 3 nH.

The resistance of resistor 306 in write element 310 is also small, e.g., about 3 ohms. The total resistance of each of the transmission line interconnects 304 and 305 between IC 301 and write element 310 can be, e.g., about 0.1 ohms, and the capacitance of capacitor 308 can be, e.g., about 0.5 picofarads (pF). The current, resistance, inductance, and capacitance values provided herein are examples and are not intended to limit the scope of the present invention. The present invention can be utilized with circuit elements that have other current, resistance, inductance, and capacitance values.

Many prior art designs used the write element to terminate the write current signal. Because many write elements have inherently low inductances and low resistive elements, they do not closely match the characteristic impedance of the transmission line interconnect $Z_0$.

On the other hand, the write through driver of FIG. 3 can function with a write element that has a low inductance value. In the configuration of FIG. 3, a low inductance value in the write element 310 does not degrade the write performance of the disk drive or increase signal reflection on the transmission line interconnects, because resistor 303 terminates the write current signal. Resistor 303 provides a more accurate receiver termination than a low impedance write element. Resistor 303 can be selected to match the characteristic impedance $Z_0$ of the transmission line interconnects 304-305 to reduce or eliminate signal reflection.

The write through driver of FIG. 3 also provides other advantages, including a reduced write drive voltage and reduced power consumption. The write current ($I_W$) is determined by the output voltage $V_{OUT}$ of the write driver. Equation (1) shows the expression for the write current. Typically, the head resistance, $R_H$, of resistor 306 is much less than the termination resistance and the interconnect characteristic impedance $Z_0$.

$$I_W = \frac{V_{OUT}}{\frac{R_{WD}}{2} + R_H} \approx \frac{2V_{OUT}}{R_{WD}} \quad (1)$$

From equation (1), it can be seen that the output voltage $V_{OUT}$ of the write driver 302 approximately equals $R_{WD} \times I_W / 2$, where $R_{WD}/2$ is the resistance of termination resistor 303. An example value for the write current $I_W$ is 60 mA. Example values for the output voltage are 1-3 volts. Example values for the resistance of resistor 303 are 30-50 ohms. The example current, resistance, and voltage values provided herein are not intended to limit the scope of the present invention. The present invention can be utilized with circuit elements that have other current, resistance, and voltage values.

Some prior art write drivers drive a differential output signal to a write element through two resistors, each having a resistance of $R_{WD}/2$. These differential write drivers drive the write element with a drive voltage equal to approximately $R_{WD} \times I_W$. The single-ended write through driver of FIG. 3 requires half the output voltage ($R_{WD} \times I_W/2$) to drive an equivalent write element with the same write current. Because the write through driver of FIG. 3 requires less output voltage to generate the same amount of output current, the write through driver of FIG. 3 also consumes less power than a standard differential write driver.

A further advantage of the write through driver of FIG. 3 is that it can provide a mechanism for monitoring the write current flowing through the write element using write sensing circuit 311. The current flowing through resistor 303 can be calculated based on the voltage at terminal T2 and the resistance of resistor 303 using Ohm's law. Write sensing circuit 311 senses a varying voltage across resistor 303 using a voltage sensing circuit and a timing circuit. Write sensing circuit 311 can be part of read/write IC 301 as shown in FIG. 3 or external to read/write IC 301.

The current through resistor 303 equals the current $I_W$ flowing through the write element 310. By being able to sense the current flowing through the write element, a determination can be made as to when the write element is actually writing data to the magnetic hard disk. The current waveform through resistor 303 also indicates what data is being written on the disk. Evaluating the current through resistor 303 provides an extra check on the reliability and accuracy of the hard disk drive system.

Also, write sensing circuit 311 can be used to sense the return signal through resistor 303 for the diagnosis of a write-safe condition. Write safe conditions include a high ohmic condition of the write element, a low ohmic condition of the write element, and a normal write operating condition. The write sensing circuit 311 can, for example, include a comparator, or a peak detection circuit, that operates in combination with a timing circuit for detecting the three modes of operation and any incorrect transition rates in the current signal $I_W$ through the write element 310.

The write through driver of FIG. 3 can be used to drive a write element that writes data using longitudinal or perpendicular recording techniques. The write through driver of FIG. 3 can drive helical-coil, standard type write elements, and other types of write elements. According to an alternative embodiment of the present invention, the circuit elements in read/write IC 301 and write element 310 are on the same die (i.e., the same integrated circuit).

Figure 4:
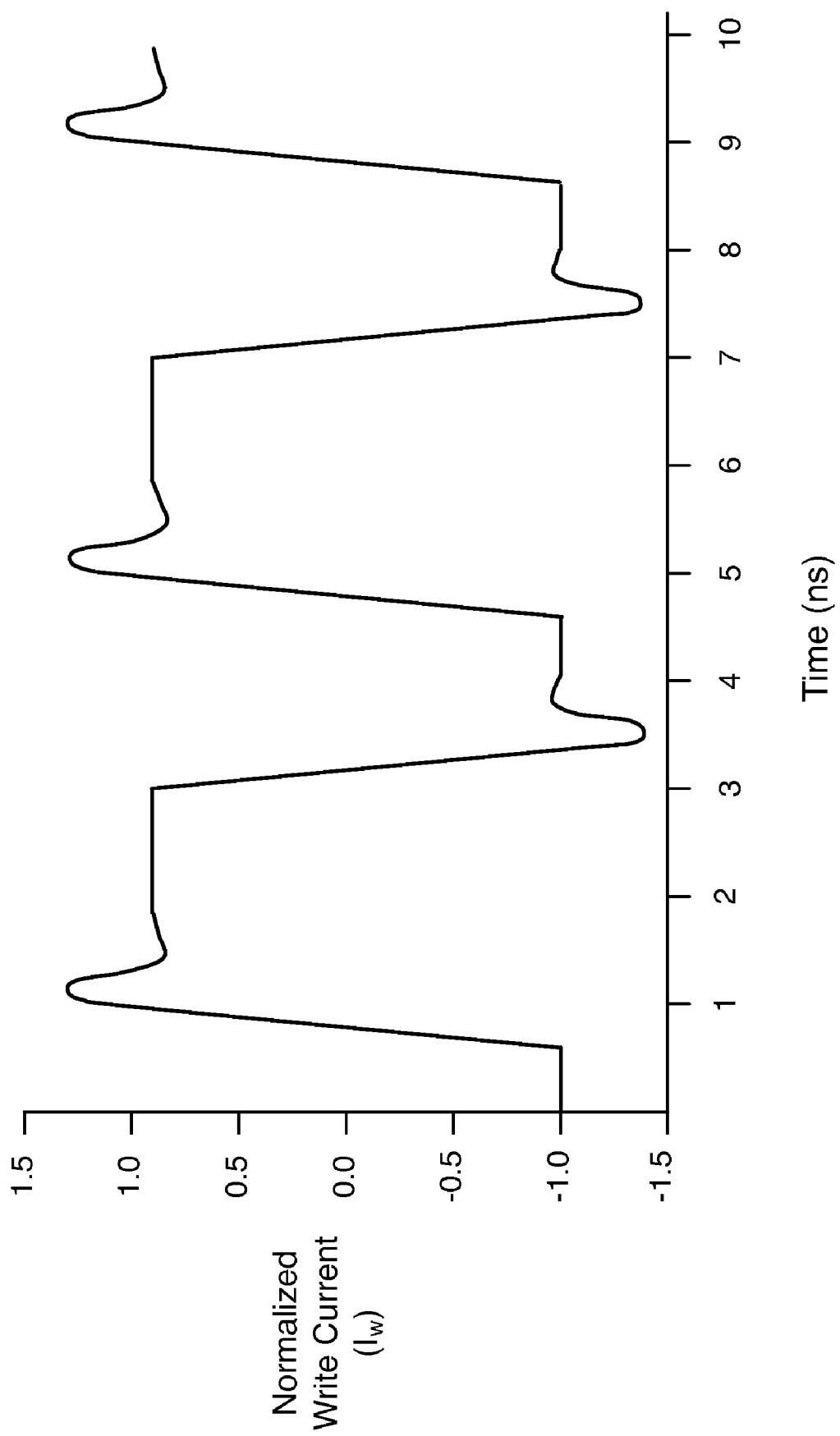
FIG. 4 is a graph that illustrates an example of the write current generated by the write through driver of FIG. 3.

FIG. 4 is a graph that illustrates an example of the write current in the write through driver of FIG. 3. The write current $I_W$ is illustrated in FIG. 4 as a normalized write current waveform that varies over time. The waveform shown in FIG. 4 is merely one example of a write current waveform for the write through driver of FIG. 3. The example waveform shown in FIG. 4 is not intended to limit the scope of the present invention. The write current waveform of a write through driver of the present invention varies depending on the write data signal.

The foregoing description of the exemplary embodiments of the present invention has been presented for the purposes of illustration and description. It is not intended to be exhaustive or to limit the present invention to the precise form disclosed. A latitude of modification, various changes, and substitutions are intended in the present invention. In some instances, features of the present invention can be employed without a corresponding use of other features as set forth. Many modifications and variations are possible in light of the above teachings, without departing from the scope of the present invention. It is intended that the scope of the present invention be limited not with this detailed description, but rather by the claims appended hereto.

The invention claimed is:

1. A disk drive system comprising:
    a transceiver circuit comprising a write driver transmitter circuit and a receiver circuit;
    a write element for writing data patterns on a disk storage medium in response to a write signal generated by the write driver transmitter circuit;
    a first conductive interconnect connecting the write driver transmitter circuit to the write element, wherein the first conductive interconnect comprises a first characteristic impedance; and
    a second conductive interconnect connecting the write element to the receiver circuit, wherein a second conductive interconnect comprises a second characteristic impedance, wherein the write signal flows through the first conductive interconnect, the write element, and the second conductive interconnect to the receiver circuit, wherein the receiver circuit comprises at least one resistor that terminates the write signal, and wherein the at least one resistor matches both the first characteristic impedance of the first conductive interconnect and the second characteristic impedance of the second conductive interconnect.

2. The disk drive system defined in claim 1 wherein the at least one resistor both matching the first and the second characteristic impedances and terminating the write signal reduces signal reflection on the first and the second conductive interconnects and prevents the write element from degrading a write performance of the disk drive system.

3. The disk drive system defined in claim 1 wherein the receiver circuit comprises at least one transistor.

4. The disk drive system defined in claim 1 wherein the write driver transmitter circuit has a single-ended output.

5. The disk drive system defined in claim 1 further comprising:
    a write sensing circuit coupled to the receiver circuit for sensing current through the receiver circuit.

6. The disk drive system defined in claim 5 wherein the write sensing circuit senses write-safe conditions.

7. The disk drive system defined in claim 1 wherein the transceiver circuit and the write element are located on separate die.

8. The disk drive system defined in claim 1 wherein the write element includes an inductor.

9. A disk drive system comprising:
    read/write integrated circuit (IC) comprising a write driver circuit having a single-ended output coupled to a first conductive interconnect, and a resistive receiver circuit coupled to a second conductive interconnect, wherein the write driver circuit generates a write signal; and
    a write element for writing data patterns on a disk storage medium, the write element being coupled to the first and the second conductive interconnects, wherein the first conductive interconnect comprises a first characteristic impedance, wherein the second conductive interconnect comprises a second characteristic impedance, wherein the resistive receiver circuit comprises a resistive circuit that terminates the write signal, and wherein the resistive circuit matches both the first characteristic impedance of the first conductive interconnect and the second characteristic impedance of the second conductive interconnect.

10. The disk drive system defined in claim 9 wherein the resistive circuit both matching the first and the second characteristic impedances and terminating the write signal reduces signal reflection on the first and the second conductive interconnects and prevents the write element from degrading a write performance of the disk drive system.

11. The disk drive system defined in claim 9 wherein the resistive receiver circuit comprises at least one transistor.

12. The disk drive system defined in claim 9 wherein the write element includes an inductor.

13. The disk drive system defined in claim 9 wherein the resistive receiver circuit is coupled between the second conductive interconnect and ground.

14. The disk drive system defined in claim 9 wherein the read/write IC further comprises a write sensing circuit coupled to the resistive receiver circuit.

15. The disk drive system defined in claim 14 wherein the write sensing circuit senses write-safe conditions.

16. A method for writing data patterns on a disk storage medium, the method comprising:
    generating a write signal from a write driver transmitter circuit in a transceiver, wherein the transceiver further comprises a receiver circuit;
    writing data patterns on the disk storage medium in response to the write signal, wherein the write signal flows from the write driver transmitter circuit to a write element via a first conductive interconnect; and
    transmitting the write signal from the write element to the receiver circuit in the transceiver via a second conductive interconnect, wherein the first conductive interconnect comprises a first characteristic impedance, wherein the second conductive interconnect comprises a second characteristic impedance, wherein the receiver circuit comprises at least one resistor that terminates the write signal, and wherein the at least one resistor matches both the first characteristic impedance of the first conductive interconnect and the second characteristic impedance of the second conductive interconnect.

17. The method defined in claim 16 wherein the write driver transmitter circuit generates the write signal as a single-ended write signal.

18. The method defined in claim 16 wherein the at least one resistor is a passive resistor.

19. The method defined in claim 16 further comprising:
    sensing current through the receiver circuit using a write sensing circuit.

* * * * *